United States Patent [19]
Yagi

[11] Patent Number: 5,079,655
[45] Date of Patent: Jan. 7, 1992

[54] VIBRATION ABSORBING STRUCTURE FOR A DISC APPARATUS

[75] Inventor: Norio Yagi, Yokohama, Japan

[73] Assignee: Fujitsu Limited, Kawasaki, Japan

[21] Appl. No.: 349,311

[22] Filed: May 9, 1989

[30] Foreign Application Priority Data

May 13, 1988 [JP] Japan .................................. 63-114762

[51] Int. Cl.$^5$ ....................... G11B 33/08; G11B 25/04
[52] U.S. Cl. ................................. 360/97.02; 360/97.01
[58] Field of Search ............... 360/97.02, 97.01, 97.03, 360/97.04

[56] References Cited

U.S. PATENT DOCUMENTS

| | | | |
|---|---|---|---|
| 3,912,278 | 10/1975 | Teutsch | 360/97.02 |
| 4,553,183 | 11/1985 | Brown et al. | 360/97.02 |
| 4,660,190 | 4/1987 | Fujii et al. | 369/13 |
| 4,731,777 | 3/1988 | Yoshitoshi et al. | 369/246 |
| 4,782,476 | 11/1988 | Sekimoto et al. | 360/114 |
| 4,812,932 | 3/1989 | Hishinuma et al. | 360/97.01 |
| 4,831,476 | 5/1989 | Branc et al. | 360/97.02 |

FOREIGN PATENT DOCUMENTS

| | | |
|---|---|---|
| 0306715 | 3/1989 | European Pat. Off. |
| 3627451 | 2/1987 | Fed. Rep. of Germany |
| 0140472 | 12/1986 | Japan .................. 360/97.02 |
| 0086576 | 4/1987 | Japan .................. 360/97.01 |
| 0137788 | 6/1987 | Japan .................. 360/97.02 |

Primary Examiner—John H. Wolff
Assistant Examiner—Craig A. Renner
Attorney, Agent, or Firm—Staas & Halsey

[57] ABSTRACT

A disc apparatus includes rotatable discs each having a recording disc surface or surfaces, a head for recording and reproducing information to or from the disc, and an actuator for moving the head along the surface of the disc. The disc, the head, the actuator, and the like are accommodated in a rectangular housing which is supported on a frame of the apparatus by four dampers arranged at four corners of the housing. The center of gravity of the housing is located nearer one corner with respect to the other corners. The spring constant of the damper located at the corner which is at the greatest distance from the center of gravity is smaller than the spring constants of the other dampers.

9 Claims, 6 Drawing Sheets

VIBRATION ABSORBING STRUCTURE FOR A DISC APPARATUS

BACKGROUND OF THE INVENTION

1. Field of the Invention

This invention relates to a disc apparatus used as an external recording, reading, or memory apparatus for computers, and particularly to a structure by which vibration in such a disc apparatus is effectively absorbed.

2. Description of the Related Art

A magnetic disc apparatus includes at least one recording magnetic disc having a disc surface or surfaces; a head for recording or reproducing information to or from the disc; an actuator for moving the head along the surface of the disc; a housing for accommodating the above mentioned elements, such as the disc, the head and the actuator, and damper means for supporting the housing on a frame of the apparatus.

In such a magnetic disc apparatus, if an external vibration or shock is felt while the apparatus is in operation, or if an intensive internal vibration occurs, for example, when the head is moved over a long distance to reach a destination in a particular access operation, the reading/recording head may be moved out of line with a required track on the disc, and thus an error may occur during an information recording or reproducing operation, due to that vibration.

To protect the magnetic disc apparatus from such vibration, a structure, particularly a damper means, is required for effectively absorbing vibration caused by external elements.

SUMMARY OF THE INVENTION

An object of the present invention is to provide a structure for a disc apparatus, in which vibration of a housing caused by external elements can be effectively absorbed. Another object of the present invention is to provide a structure for a disc apparatus in which an increase of the vibration level of a damper means due to movement of the head for access can be prevented. According to the present invention, there is provided a disc apparatus having a frame and including at least one rotatable recording disc having a disc surface or surfaces; a head for recording or reproducing information to or from the disc; an actuator for moving the head along the surface of the disc; a housing for accommodating the disc, the head, the actuator, and the like; and damper means for supporting the housing on the frame of the apparatus. The housing containing the disc, the head, the actuator and the like, has a center of gravity and is supported on the frame of the apparatus by the damper means which comprises a plurality of dampers having respective spring constants that are not all the same, there being a respective one of the dampers located at each of at least three separate positions that are spaced from one another on the housing. Each of the positions where the dampers are located are spaced from the center of gravity and one of the positions is at a distance from the center of gravity that is greater than the distance from the center of gravity of a second one of the positions. The damper located at the position which is at a greater distance from the center of gravity has a spring constant that is smaller than the spring constant of the damper that is located at a position that is closer to the center of gravity.

In another aspect of the present invention, there is provided a disc apparatus having a frame and including at least one rotatable disc having a recording disc surface or surfaces and an axis of rotation extending perpendicularly through said surface; at least one head for recording or reproducing information to or from the disc; an arm pivotal about an axis that is parallel to the axis of rotation of the disc, said head being mounted on such arm; an actuator for causing the arm to pivot about its axis to move the head along the surface of the disc; a housing for accommodating the disc, the head, the actuator, and the like; and damper means for supporting the housing on a frame of the apparatus. The housing in this aspect of the invention is substantially rectangular-shaped, having four corners and a center of gravity that is spaced from each of the corners. The center of gravity is located further from one of the corners than from the other corners. The damper means comprises a respective damper located at each of the corners, such dampers having respective spring constants that are not all the same. The damper at the corner which is located further from the center of gravity than the other corners has a spring constant that is smaller than the spring constants of the dampers at the other corners.

DESCRIPTION OF THE PREFERRED EMBODIMENTS

Figure 1:
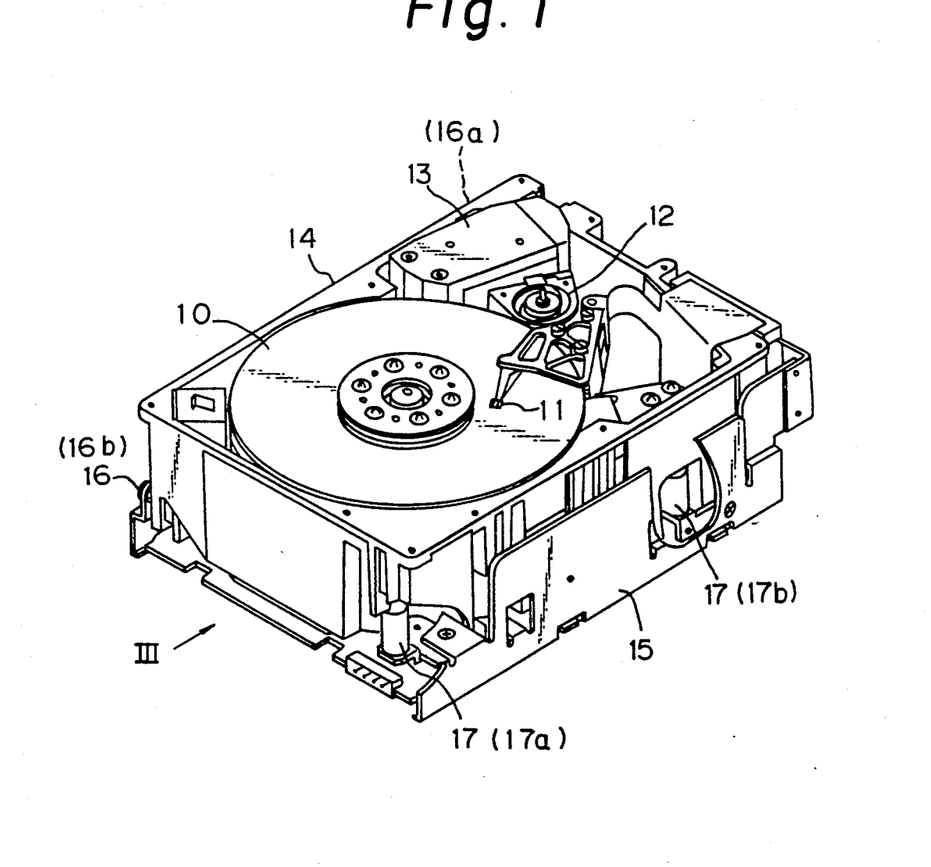
FIG. 1 is a perspective view, with portions partially cutaway, of an embodiment of a disc apparatus of the present invention.
Figure 2:
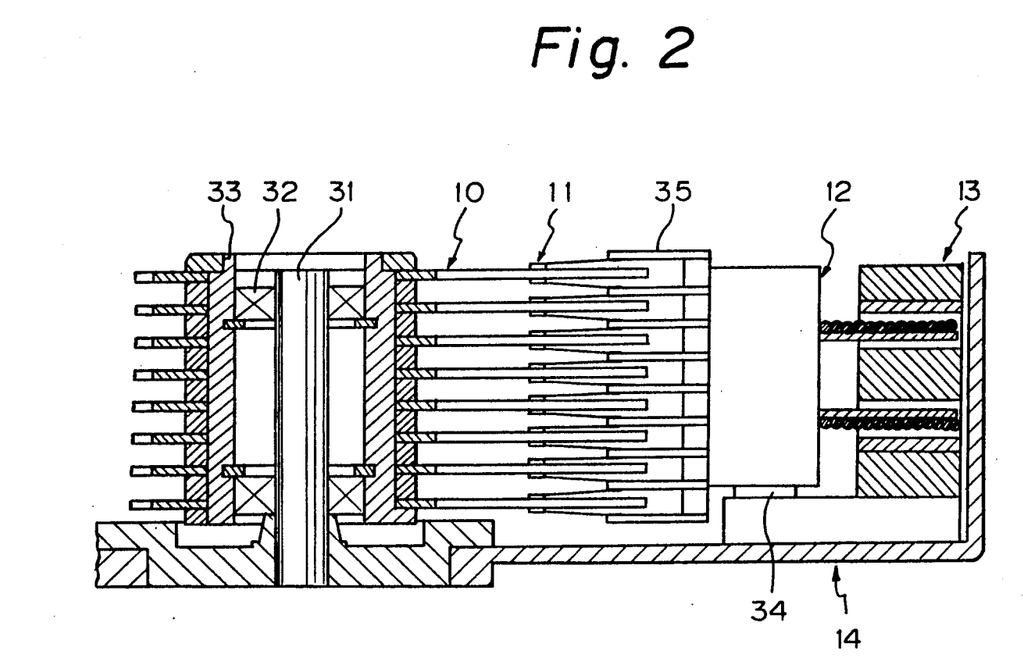
FIG. 2 is a cross-sectional view of a disc apparatus of the present invention, including housing, discs, heads and an actuator.

Referring now to FIGS. 1 and 2, an embodiment of a magnetic disc apparatus of the present invention is illustrated in which a plurality of magnetic discs 10, which may be 5 or 3.5 inches in size, are equidistantly arranged and spaced in parallel to each other and supported on a spindle hub 33 rotatably mounted on a stationary shaft 31 via bearings 32. The magnetic discs 10 are integrally rotated by a known drive means, such as a spindle motor, not shown in the drawings.

In this embodiment, each of the discs 10 has a magnetic recording surface or surfaces and a head 11 is provided for each magnetic recording surface, for recording and/or reproducing information to or from the magnetic recording surface. The heads 11 for the respective recording surface are mounted on the free ends of respective head arms 35 which are integrally connected to each other and pivotably rotated about a shaft 34 by an actuator 12 driven by a voice coil motor 13, whereby the heads 11 can be moved along the respective magnetic surfaces of the discs 10.

A housing 14 accommodates the various elements of this disc apparatus, such as the discs 10, the heads 11, the actuator 12 including the shaft 34, the head arms 35, and the motor 13, and the like (a lid or cover for this housing 14 is not shown in FIGS. 1 and 2), and this housing 14 is substantially rectangular or oblong shaped such that it has four corners.

As will be mentioned later, the housing 14 containing the above elements has a center of gravity G (FIG. 6) which is not located at a center of the housing 14 but nearer to one of the corners with respect to the other corners. In this embodiment, the housing 14 is supported on a frame 15 of the apparatus by four rubber dampers 16 (16a and 16b) and 17 (17a and 17b) arranged in the vicinity of the four corners of the housing 14, respectively.

Figure 3:
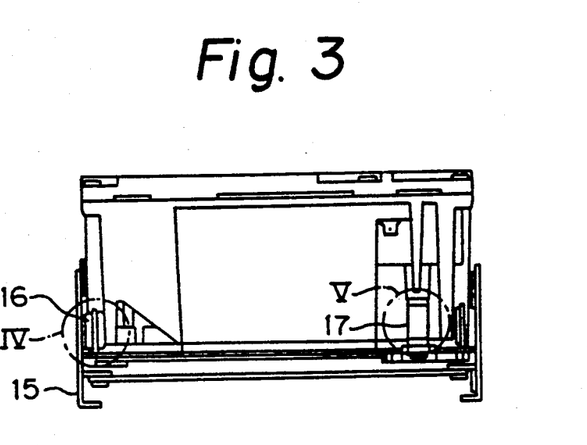
FIG. 3 is a front view of the disc apparatus of FIG. 1 taken in the direction of arrow III.
Figure 4:
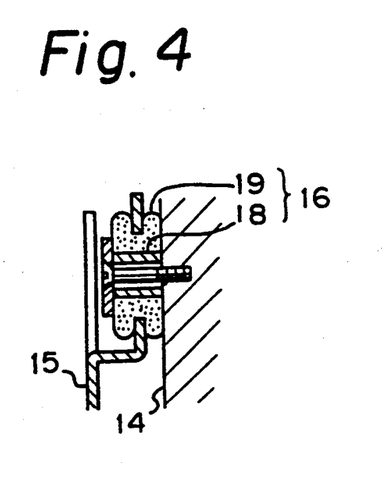
FIG. 4 is an enlarged view of the encircled portion IV of FIG. 3.

The rubber dampers 16a and 16b are arranged on one side of the housing 14 and the same are spaced from each other in the longitudinal direction. These dampers 16a and 16b are thrust-type dampers positioned so as to support the vertical side faces of the housing 14, as shown in FIGS. 3 and 4. Each of the dampers 16 comprises a metal bushing 18 and a grommet-like damper rubber element 19 integrally formed on the bushing 18, which is fixedly attached to the vertical side wall of the housing 14 by, for example, a screw bolt. The rubber element 19 is supported by a vertical portion of the frame 15 of this disc apparatus.

Figure 5:
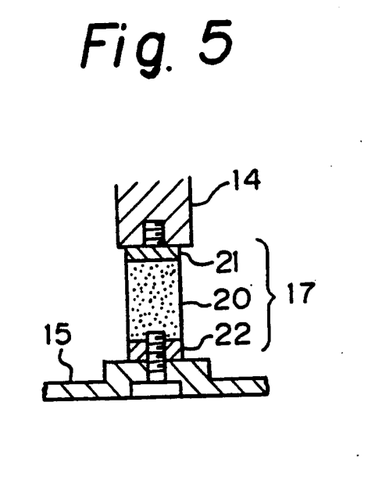
FIG. 5 is an enlarged view of the encircled portion V of FIG. 3.

Further, the two rubber dampers 17 (17a and 17b) are arranged on the other side of the housing 14 and are also spaced from each other in the longitudinal direction. These dampers 17 are positioned so as to vertically support the housing 14 in a direction parallel to the axis of rotation of the discs 10 about shaft 31, as shown in FIGS. 3 and 5. Each of the dampers 17 (17a and 17b) comprises a column-shaped or cylindrical rubber member 20 and metal plates 21 and 22 integrally attached to the upper and lower ends of the cylindrical rubber member 20, respectively. Each upper metal plate 21 is provided with an integral screw bolt which is rigidly engaged with a threaded hole in the housing 14, to rigidly connect the respective damper 17a or 17b to a bottom portion of the housing 14. Further, each lower metal plate 22 is provided with a threaded hole in which a screw bolt is engaged, so as to rigidly connect the corresponding damper 17a and 17b to a horizontal portion of the frame 15 of this disc apparatus. Accordingly, each damper 17 is positioned so as to vertically support the housing 14 in the direction parallel to the axis of rotation of the discs 10 about shaft 31.

In one embodiment, the dampers 16a, 16b, 17a and 17b each has a different spring constant, and the same are located in such a manner that the spring constant of the damper at a position which is at a greater distance from the center of gravity G is smaller than the spring constant of the damper at a position nearer to the center of gravity G. In this specification, the term "spring constant" means a spring constant in the horizontal direction of rotation with respect to a vertical line at the center of gravity (G) of the housing 14.

Figure 6:
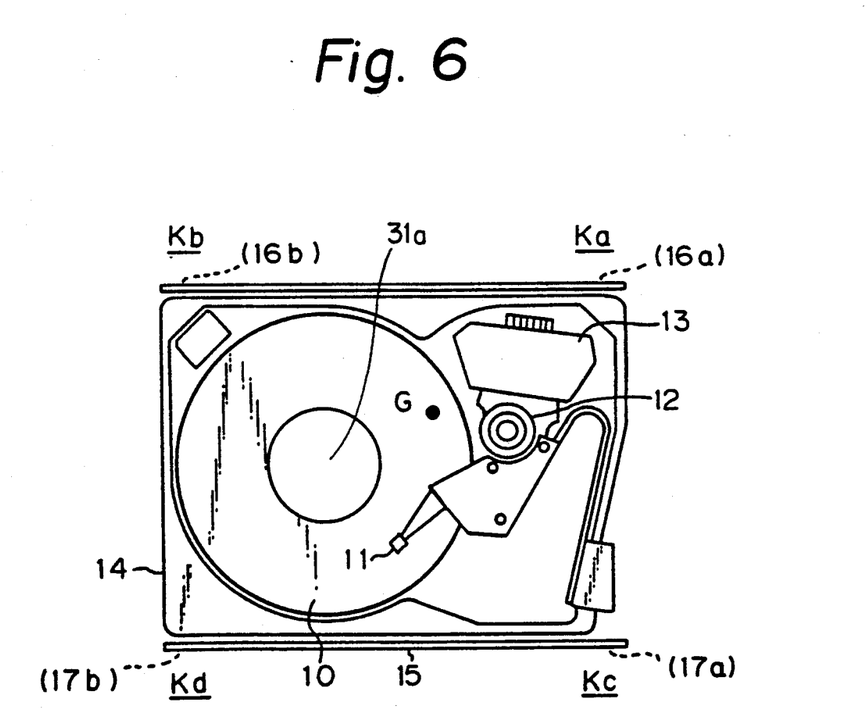
FIG. 6 is a schematic plan view of an embodiment of a disc apparatus, including a plurality of dampers having respective spring constants Ka, Kb, Kc, and Kd according to the present invention.

Therefore, as shown in FIG. 6, the housing 14 containing the discs 10, the heads 11, and the actuator 12, the voice coil motor 13, and the like has a center of gravity G which is not located at the center of the housing but is nearer to one of the corners thereof. In the embodiment illustrated in FIG. 6, for example, the center of gravity G is located roughly at a position between the axis of rotation 31a of the spindle shaft 31 of the discs 10 and the voice coil motor 13.

Accordingly, the distance from the center of gravity G to the position of damper 16a is the smallest and the distance from the center of gravity G to the position of damper 17b is the greatest, and therefore, the damper 16a has the largest spring constant (Ka), the damper 17b as the smallest spring constant (Kd), and spring constants (Kb, Kc) of the dampers 16b and 17a are intermediate values, as follows:

$$K_a \geq K_b \text{ or } K_c, \text{ and } K_d < K_b \text{ or } K_c.$$

In general, to change the spring constant of a given damper, any of the conventionally known methods can be adopted. For example, the spring constant can be changed by selecting a damper rubber material having a different stiffness or hardness, or by changing the shape or size of the damper rubber element or member, for example, by changing the cross-sectional area, the length, or the like thereof. The spring constant also can be changed by changing the type of structure supporting the rubber damper, for example, by changing the damper from the configuration of FIG. 4 to that of FIG. 5, or vice versa.

Obviously, to increase the spring constant a damper having a larger stiffness must be used; for example, to increase the spring constant of a cylindrical damper rubber member, the cross-sectional area may be increased or the length decreased.

Figure 7A:
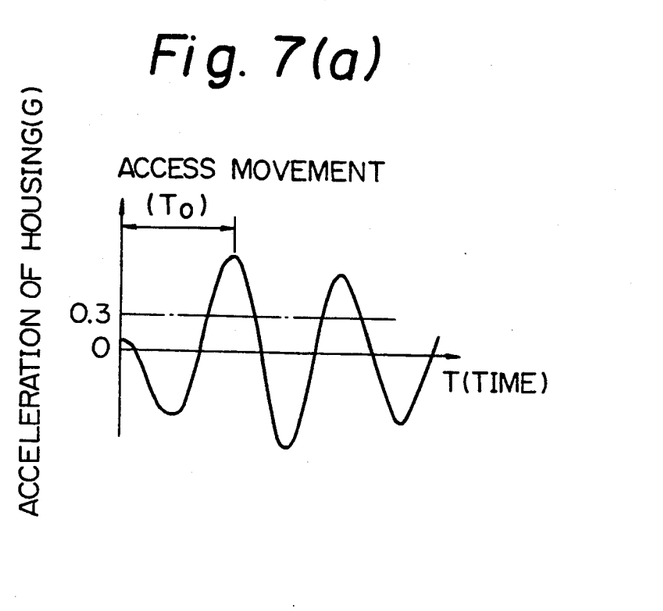
FIGS. 7(a) and (b) are diagrams respectively showing the dampening characteristics of dampers arranged in accordance with the prior art and of dampers arranged in accordance with the present invention.
Figure 7B:
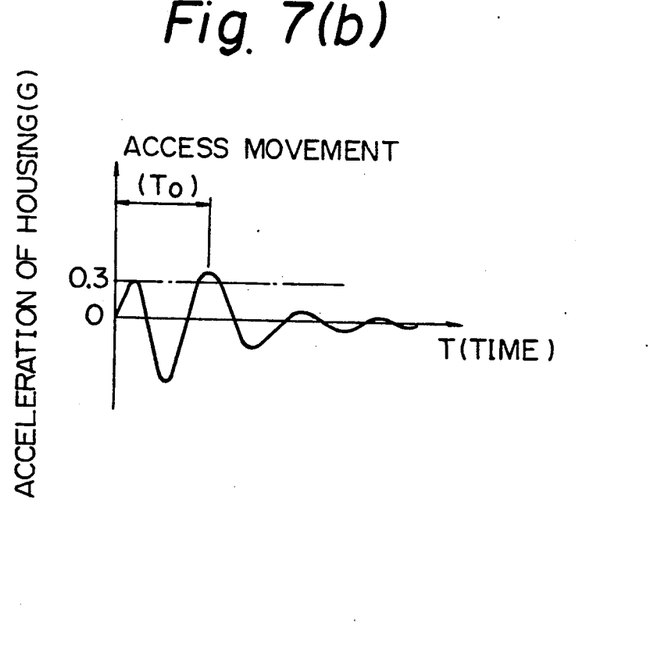

FIGS. 7(a) and 7(b) are diagrams showing the vibration characteristics of the damper rubbers under a high temperature condition (e.g. about 50°) when used in a disc apparatus of a prior art and in the embodiment of this invention, respectively. Here, it is assumed that the disc apparatus of the prior art is the same as the disc apparatus of this embodiment, except that the rectangular housing 14 of the prior art is supported by four rubber dampers which are of the same size and have the same spring constant, and that these four rubber dampers are all of the type shown in FIG. 4, i.e., the side-support type dampers and the same are provided at the respective four corners of the rectangular housing 14.

In FIGS. 7(a) and 7(b), the abscissa indicates the time (T) and the ordinate indicates the acceleration (G) of the housing 14 during and after the access movement of the heads 11. The time ($T_0$) of the access movement is a time during which the heads 11 are moved from one position to another position on the recording disc surfaces.

In the prior art, the acceleration (G) of the housing 14 during the time ($T_0$) of the access movement of the head 11 is relatively large, as shown in FIG. 7(a). Also, after the access movement, the attenuation or damping continues for a relatively longer time. Therefore, in the prior art, the vibration has an affect on the head 11, which may be moved out of line with a required track on the disc 10 during the access movement, so that an error may occur during an information recording or reproducing operation.

Conversely, according to the illustrated embodiment of this invention, the acceleration (G) of the housing during the time ($T_0$) of the access movement of the head 11 is relatively small and the attenuation or damping continues only for a relatively shorter time after the access movement, as shown in FIG. 7(b). Thus, in this embodiment, the vibration is so small that the head 11 is not caused to move out of line during the access movement.

The basic principle of how the attenuation or damping of the housing (disc apparatus) of this embodiment is quicker than that of the prior art, is explained as follows.

As a reaction to the access movement of the voice coil motor (i.e., the movement of the actuator 12 including the arms 35 about the shaft 34), the housing 14 tends to rotate about the center of gravity (G) thereof, and thus the housing 14 generates a rotational vibration about the vertical line at the center of gravity (G). Such a vibration can be absorbed by the dampers, but has an energy which is larger at positions farther from the center of gravity (G) and smaller at positions nearer to the center of gravity (G).

According to the present invention, since the spring constant of a damper located at a position at a greater distance from the center of gravity (G) is less than that of a damper located at a position nearer to the center of gravity (G), the displacement of the housing 14 can be larger at a position further from the voice coil motor 13 and smaller at a position nearest to the voice coil motor 13, since the voice coil motor 13 is situated near the center of gravity (G). This means, that at a certain angle of rotation of the housing 14, the displacement of the housing 14 at a position at the greatest distance from the voice coil motor 13 can be large, to absorb the vibration of the housing 14, and on the other hand, the displacement of the housing 14 at a position nearest the voice coil motor 13 can be restricted, to reduce the acceleration at that position. Therefore, the access movement of the heads 11 is affected to a lesser degree by the vibration of the housing 14.

In the embodiment shown in FIG. 1, two thrust or side-support type dampers 16a and 16b and two vertical-support type dampers 17a and 17b are used. The side-support type damper 16, as shown in FIG. 4, is a composite spring and is subjected to both compression and thrust forces by the movement of the housing 14 during the access motion, and thus the spring constant thereof can be increased. Conversely, the vertical-support type damper 17, as shown in FIG. 5, is subjected only to a thrust force caused by the movement of the housing 14 during the access motion, and thus the spring constant thereof can be reduced. The, spring constant of the damper rubber can be changed over a wide range by changing the type of rubber damper.

Figure 8:
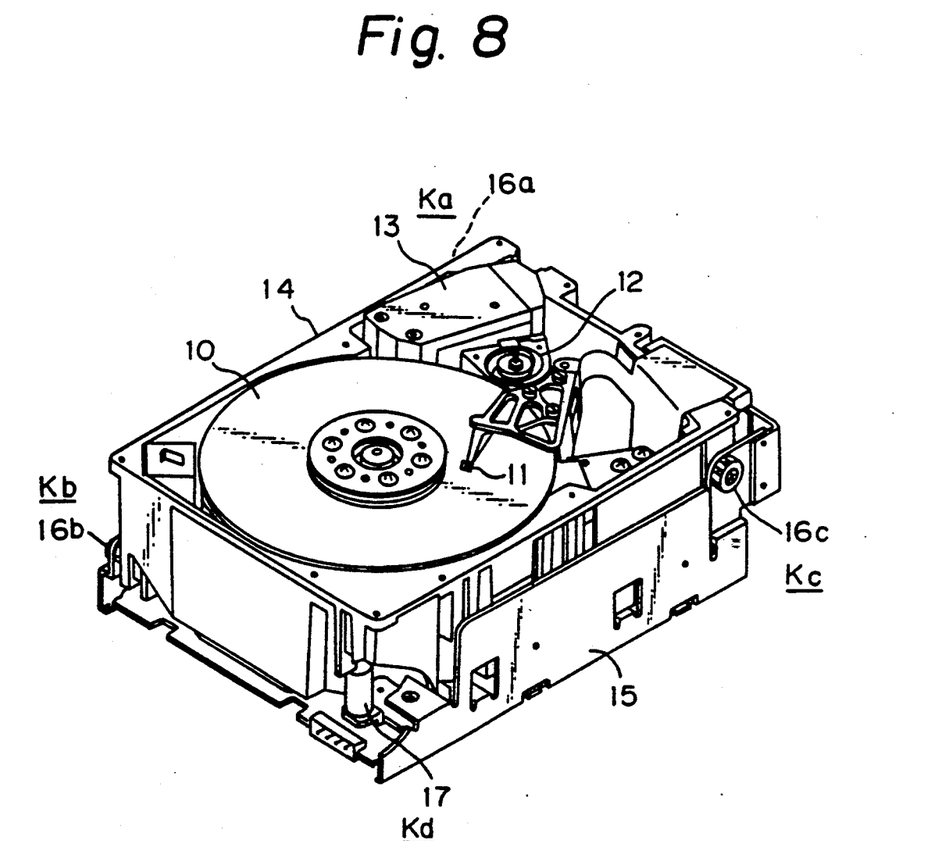
FIG. 8 is a perspective view, with portions partially cutaway, of another embodiment of a disc apparatus of the present invention.

FIG. 8 shows another embodiment of the present invention, in which three thrust or side-support type dampers 16a, 16b, 16c and one vertical-support type damper 17 are used. The damper 17 is located at a corner of the housing 14 that is at the greatest distance from the center of gravity (G). In this embodiment, the relationship between the spring constants Ka, Kb, Kc, and Kd of the dampers 16a, 16b, 16c and 17, respectively, is as follows:

$$Ka \geq Kb \text{ or } Kc, \text{ and } Kd < Kb \text{ or } Kc$$

The construction and operation of this embodiment are the same as those of the previous embodiment, except for the above-mentioned support structure.

I claim:

1. A disc apparatus having a frame and including at least one rotatable disc having a recording surface; at least one head for recording or reproducing information to or from said surface; an actuator for moving said head along said surface; a housing for accommodating said disc, said head and said actuator and having a center of gravity; and damper means for supporting said housing on the frame, said damper means comprising:
    a plurality of dampers for absorbing vibrational energy from internal and external sources, said dampers having respective spring constants that are not all the same, there being a respective one of the dampers located at each of at least three separate positions that are spaced from one another on the housing,
    each of said positions being spaced from said center of gravity,
    a first one of said positions being at a distance from the center of gravity that is greater than the distance from the center of gravity of a second one of said positions, said second one of said positions being at a distance from the center of gravity that is greater than the distance from the center of gravity of a third one of said positions,
    the damper located at said first one of the positions having a spring constant that is smaller than the spring constant of the damper located at said second one of the positions and the damper located at said second one of the positions having a spring constant that is equal to or smaller than the spring constant of the damper located at said third one of the positions.

2. A disc apparatus as set forth in claim 1, wherein said dampers are made of a rubber material.

3. A disc apparatus as set forth in claim 1, wherein the damper at said second one of the positions has a spring constant that is smaller than the spring constant of the damper located at said third one of the positions.

4. A disc apparatus as set forth in claim 3, wherein said dampers are made of a rubber material.

5. A disc apparatus having a frame and including at least one rotatable disc having a recording surface and an axis of rotation extending perpendicularly through said surface; at least one head for recording or reproducing information to or from said surface; an arm pivotable about an axis that is parallel to the axis of rotation of the disc, said head being mounted on said arm; an actuator for causing the arm to pivot about its axis to move said head along said surface; a housing for accommodating said disc, said head and said actuator, said housing being generally rectangularly-shaped and having four corners, said housing having a center of gravity that is spaced from each of said corners and is located further from at least one of said corners than from the others; and damper means for supporting said housing on the frame, said damper means comprising:
    four dampers for absorbing vibrational energy from internal and external sources; one of said dampers being located at said one of said corners and at least two of the remaining dampers being located at other respective corners, said dampers having respective spring constants that are not all the same, the damper at said one of said corners having a spring constant that is smaller than the spring constants of the other dampers.

6. A disc apparatus as set forth in claim 5, wherein said damper at said one of said corners is adapted for supporting said housing in a direction that is parallel to said axis of rotation of the disc and the other dampers are adapted for supporting said housing in directions that are perpendicular to said axis of rotation of the disc.

7. A disc apparatus as set forth in claim 6, wherein said dampers are made of a rubber material.

8. A disc apparatus as set forth in claim 5, wherein said housing is oblong-shaped and has one end that is further from said center of gravity than the other end thereof, the dampers at said one end of the housing each being adapted for supporting said housing in a direction that is parallel to said axis of rotation of the disc and the dampers at the other end of the housing each being adapted for supporting said housing in directions that are perpendicular to said axis of rotation of the disc.

9. A disc apparatus as set forth in claim 8, wherein said dampers are made of a rubber material.

* * * * *

UNITED STATES PATENT AND TRADEMARK OFFICE
CERTIFICATE OF CORRECTION

PATENT NO. : 5,079,655
DATED      : January 7, 1992
INVENTOR(S): NORIO YAGI

It is certified that error appears in the above-identified patent and that said Letters Patent is hereby corrected as shown below:

Column 4, line 11 "as" should be --has--.

Column 5, line 59, insert a period --.-- at the end of the formula.

Signed and Sealed this

Thirteenth Day of April, 1993

Attest:

STEPHEN G. KUNIN

*Attesting Officer*    Acting Commissioner of Patents and Trademarks